(12) United States Patent
Hicks et al.

(10) Patent No.: US 10,738,193 B1
(45) Date of Patent: Aug. 11, 2020

(54) DUST FREE SILICA PARTICLES

(71) Applicant: COVIA HOLDINGS CORPORATION, Independence, OH (US)

(72) Inventors: Jeffery Hicks, Asheville, NC (US); Claud E. Westbrook, Conroe, TX (US)

(73) Assignee: Covia Holdings Corporation, Independence, OH (US)

(*) Notice: Subject to any disclaimer, the term of this patent is extended or adjusted under 35 U.S.C. 154(b) by 227 days.

(21) Appl. No.: 15/907,335

(22) Filed: Feb. 28, 2018

Related U.S. Application Data

(60) Provisional application No. 62/512,401, filed on May 30, 2017.

(51) Int. Cl.
C09C 1/30 (2006.01)
C03C 1/02 (2006.01)
C09K 8/80 (2006.01)
B05D 1/12 (2006.01)

(52) U.S. Cl.
CPC ............ *C09C 1/3063* (2013.01); *B05D 1/12* (2013.01); *C03C 1/02* (2013.01); *C09K 8/805* (2013.01); *C01P 2004/60* (2013.01); *C01P 2004/61* (2013.01); *C01P 2006/22* (2013.01)

(58) Field of Classification Search
None
See application file for complete search history.

(56) References Cited

U.S. PATENT DOCUMENTS

| | | | | |
|---|---|---|---|---|
| 4,585,064 A * | 4/1986 | Graham | ................... | C09K 8/56 166/276 |
| 4,732,920 A * | 3/1988 | Graham | ................... | C09K 8/56 523/139 |
| 5,333,698 A * | 8/1994 | Van Slyke | ............... | C09K 8/34 175/65 |
| 2010/0314108 A1 * | 12/2010 | Crews | .................... | C09K 8/565 166/250.12 |
| 2014/0000891 A1 * | 1/2014 | Mahoney | ............... | C09K 8/805 166/280.2 |
| 2014/0274819 A1 * | 9/2014 | McCrary | ................ | C09K 8/805 507/219 |
| 2015/0068747 A1 * | 3/2015 | Hwang | .................. | C09K 8/685 166/280.2 |
| 2015/0119301 A1 * | 4/2015 | McDaniel | ............. | C09K 8/805 507/224 |

* cited by examiner

Primary Examiner — John J Figueroa
(74) Attorney, Agent, or Firm — Rankin, Hill & Clark LLP

(57) ABSTRACT

A long term dust free mass of natural silica particles is produced by covering 10-60 percent of the total surface area of the particles with a thin film of white mineral oil with a low viscosity of less than 200 Saybolt SUS at 100° F. and preferably in the range of 60-100 Saybolt SUS at 100° F.

Figure 1:
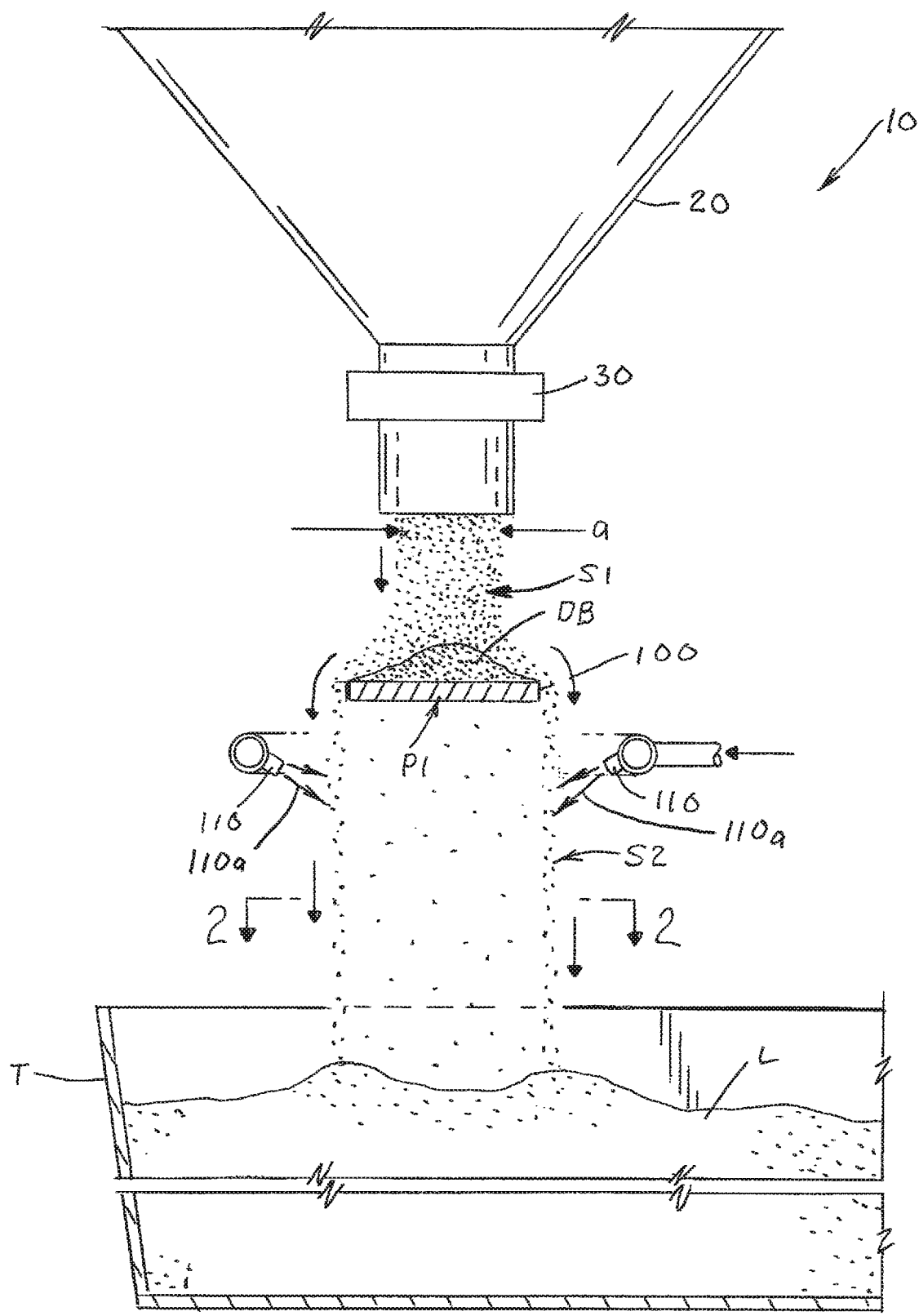

6 Claims, 8 Drawing Sheets $a/b > 5$

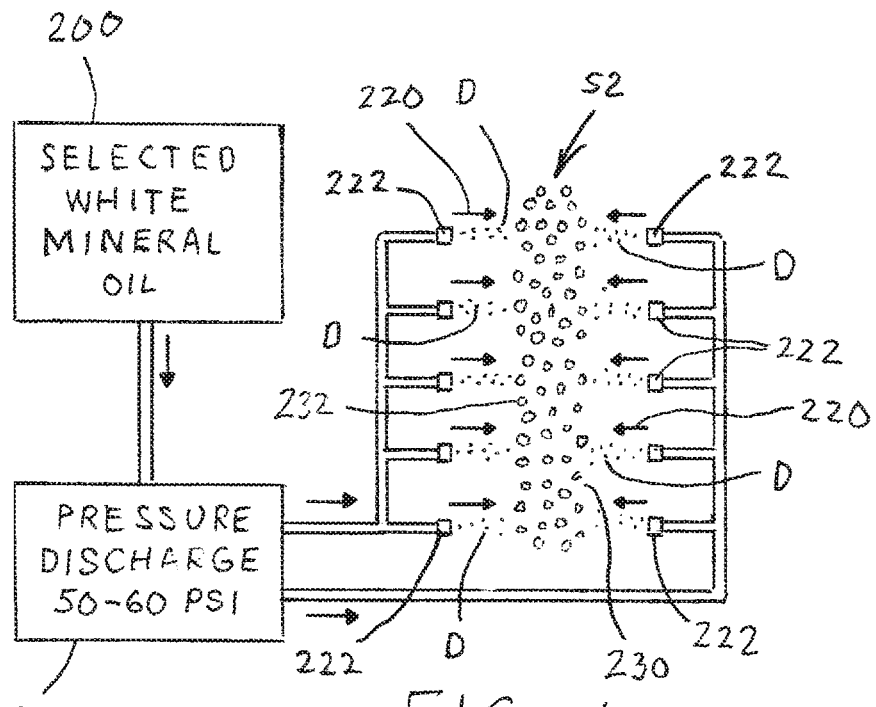
FIG. 4
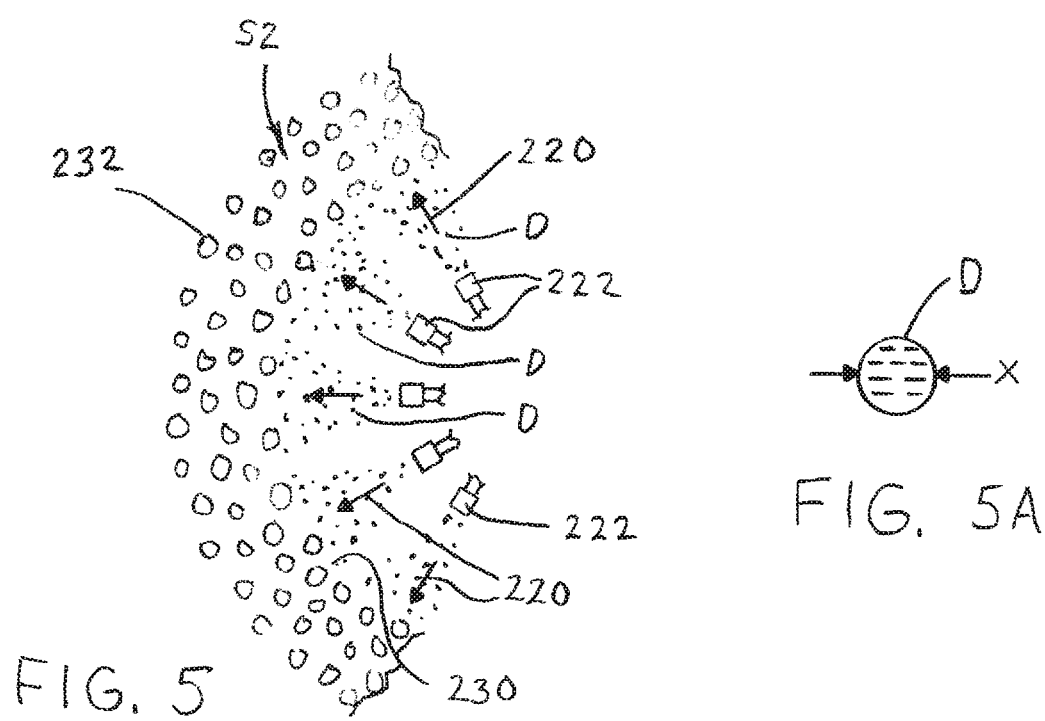
FIG. 5
FIG. 5A

DUST FREE SILICA PARTICLES

This invention relates to the art of natural silica particles for glass making, metal foundry molds and hydraulic fracturing, and more particularly to such natural silica particles that are long term dust free, as this term is defined in the art.

BACKGROUND OF THE INVENTION

Mined, inorganic natural silica particles are used in many industries. One of the primary uses of silica particles involve the use of frac sand in hydraulic fracturing wherein the silica sand is pumped into the sub-terrain in oil or gas wells to retain the open spacing of fractures for the withdrawal of the oil or gas. Use of this type of natural silica particles is defined as a proppant. Substantial effort has been made in this particular industry to reduce airborne silica dust during manufacture, transportation, and use of the frac sand. After years of work on reducing crystalline silica dust associated with frac sand in the hydraulic fracturing industry, the industry has developed systems for coating the frac sand with a solution of dust suppressant polymer materials. Much of the recent research and development work in dust reduction or control of frac sand silica dust has involved the improvement in the solution coated over the surfaces of the various sand particles and the various techniques for coating the particles with the various dust suppressant solutions. This development work has also acknowledged the fact that the solutions coated over the frac sand merely reduces the silica dust concentration at the manufacturing and production facility, so it is necessary to rapidly use the silica particle proppants at the well site before the solution loses its ability to control the measured concentration of silica dust. Consequently, prior research and development work has involved the solution, the procedure for coating the surfaces of the particles with the solution and how to maintain the low silica dust concentration for a period of time necessary to use the silica particles. These technical advances in the hydraulic fracturing industry to control the silica dust concentration to a low level has been generally successful in this particular art; however, natural silica particles have other very important uses. Such silica particles are used in glass making and in molds for metal foundries. All the work of silica dust reduction and reducing the measured dust concentration of natural silica particles in the hydraulic fracturing industry have not been advantageous in these other industries. For instance, the amount and composition of solutions used to reduce dust concentration in the hydraulic fracturing art can cause side effects in these other industries. Furthermore, the amount of dust suppressant solution necessary to coat the individual silica particles exacerbates the side effect problem and creates more problems of introducing unwanted impurities into the other uses of these natural silica particles. Consequently, if the natural particles are to be used in all industries, such as glass making and metal foundry work, as well as in the hydraulic fracturing, the extensive and expensive development work for hydraulic fracturing was generally unsuccessful or at least need technical improvement. Furthermore, in these other industries the time between producing the silica particles and use greatly exceeded the relatively short time that can be employed in the hydraulic fracturing art. All these disadvantages of reducing dust concentration for silica particles as developed over the many years in the hydraulic fracturing art could not be used to the best advantage if the particles were to be used in the various industries and can be improved as by the novel silica particle mass of the present invention for the various industries.

THE INVENTION

The present invention is a new procedure for reducing the dust concentration of natural silica particles, which procedure can be used in the hydraulic fracturing art, but can also be used in the other industries, such as glass making and foundry uses.

A mass of free flowing, natural silica particles are rendered long term dust free by having the surfaces of the particles covered with film areas of a white mineral oil having a very low viscosity, so the film is very thin as it covers as much of the surfaces as possible while still maintaining the amount of white mineral oil very small. White mineral oil is the most purified mineral oil, so it has the less tendency to create unwanted side effects or impurity contamination. The viscosity of the white mineral oil used in the invention is less than 200 Saybolt SUS at 100° F. Preferably, the low viscosity is in the range of 60-100 Saybolt SUS at 100° F. so the small amount of oil creates very thin film covering a larger amount of the particle surfaces. The thin film areas of white mineral oil on the surfaces of the silica particles are, in the preferred embodiments, formed by propelling discrete liquid masses against the silica particles. These discrete liquid masses may be small air atomized droplets or large pressurized globules of the selected white mineral oil. By using a very small amount of white mineral oil, i.e. less than 1000 ppm and preferably in the range of 200-600 ppm by weight of the mass, the coverage by the oil is partial but larger because of the very low viscosity. With this small amount of mineral oil, the particle surfaces are only partially covered with the thin areas of mineral oil and the total surface covered is increased by the thin film caused by the oil. Due to the low viscosity, the film is reduced in thickness, but extended in covered area so coverage is in the range of 10-60 percent of the total surfaces of the particles. Surprisingly, this results in the advantageous properties obtained by the novel silica particle mass.

Discrete masses of white mineral oil are spread to create thin mineral oil areas on the surfaces of the silica particles. The film thickness of these areas may be as low as 2 to 4 molecules of the white mineral oil so a very small amount of oil can create 10-60 percent coverage to make the silica particles dust free, and, indeed long term dust free. In accordance with the invention, these thin film areas of white mineral oil on the silica surfaces of the silica particle comprise less than 1,000 ppm by weight of the mass. Thus, there is very little white mineral oil spread over the surfaces of the various particles; however, the low viscosity increases the covered amount of surface area. Theoretically, these film areas formed from a thin layer of white mineral oil cover from zero percent to 100 percent of the surface areas of each particle. Consequently, one of the particles could have complete coverage of oil film and another particle could have no coverage. This is highly unlikely, but it is theoretically possible. By using a small amount of white mineral oil with the spread due to very low viscosity, the thin film areas of oil actually cover 10 percent to 60 percent of the total surface areas of the silica particles. Preferably, 30 percent to 50 percent of the total surface areas of the silica particles are covered by the white mineral oil film areas over the surfaces of the particles. A very small amount of mineral oil is used. This drastically reduces the costs of the process and, also, introduces a very small amount of alien material to the silica particles. Thus, the side effects in the various industries is drastically reduced. In practice, the amount of white mineral oil over the surfaces of the silica powders is in the range of 200-600 ppm by weight of the total mass to produce the defined amount of surface coverage to obtain the desired, surprising and novel results of the invention. Thus, the silica particles are not totally covered. There is no water based solution as used in the past, so the dust concentration lasts much longer.

By creating the mass of silica particles in accordance with the invention, the film areas of white mineral oil reduce silica dust by capturing over 90 percent of the total airborne dust of the particles of the mass to create an 8-hour time weighted average (TWA) crystalline silica dust measurement of less than 0.05 milligrams per cubic meter exposure level. This reduced measured dust concentration or exposure level remains at a value of less than 0.05 milligrams per cubic meter for over 10 days. Consequently, the treated silica particles are "long term dust free" even though there is still a very minor and insignificant amount of crystalline silica dust.

As indicated above, the novel mass of treated natural silica particles is used for one of the industries in the class consisting of glass making, metal foundry, and hydraulic fracturing. In hydraulic fracturing, long term dust free particles retain the low crystalline silica dust measurement of less than 0.05 milligrams per cubic meter for more than four days. In accordance with the present invention, the long term dust free particles maintain the low silica dust TWA measurement of less than 0.05 milligrams per cubic meter exposure level for over ten days. Consequently, the novel mass of silica particles is usable in the hydraulic fracturing art, but also advantageously usable in the other industries discussed above with the advantage of less added materials.

Figure 6:
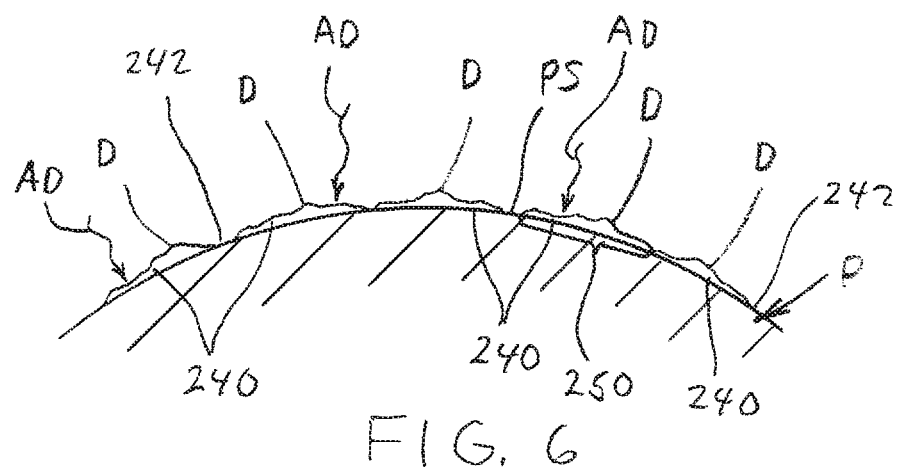
Figure 7:
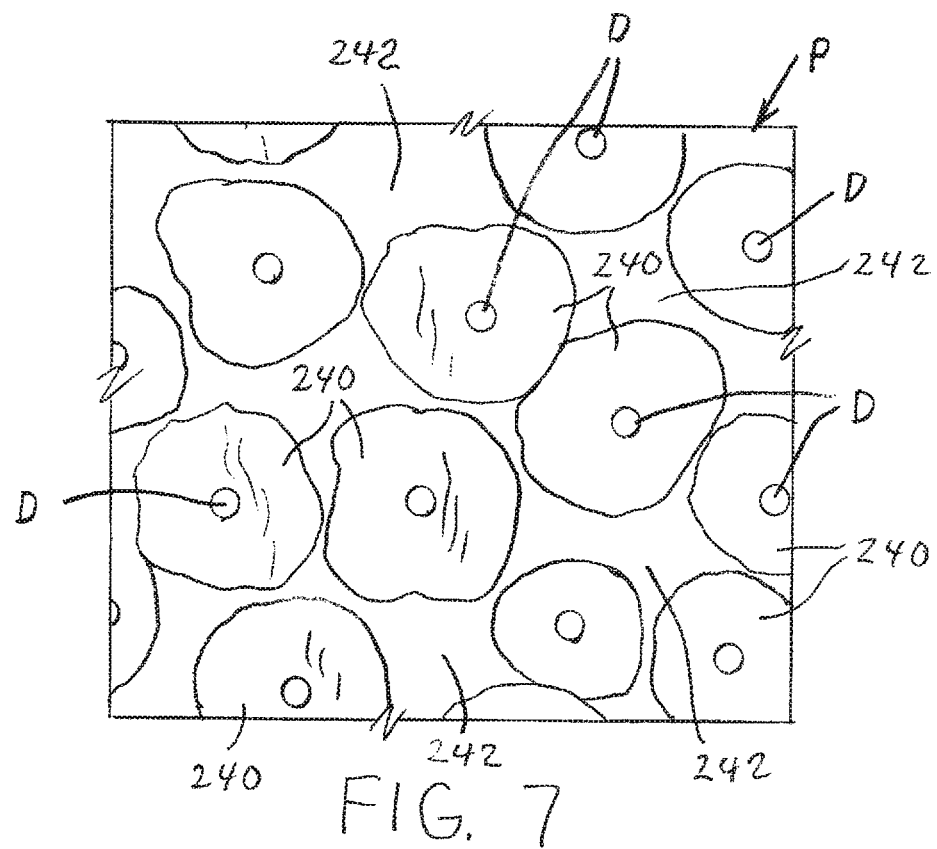

In accordance with one practical embodiment of the invention, discrete liquid masses of white mineral oil as small droplets are formed by atomization of the white mineral oil with pressurized air, where each small droplet has an effective diameter of less than 300 microns. Preferably, the effective diameter of each of these small atomized droplets of white mineral oil are in the range 50-100 microns. Consequently, these very small droplets are deposited onto the surface of the various particles and then spread out over the particles due to the very low viscosity of the white mineral oil as schematically shown in FIGS. 6 and 7. In this manner, 10-60 percent of the total surface areas of the particles are covered by mineral oil by using the small droplets. The mineral oil film areas actually capture dust particles on the surface under the thin film areas. In addition, the selected white mineral oil has the ability to attract airborne dust particles. Thus, the mineral oil covers silica dust particles on the surface and attracts other silica dust particles to reduce the measured silica dust concentration or exposure level to the level of less than 0.05 milligrams per cubic meter.

In accordance with another practical embodiment of the invention, the discrete liquid masses of white mineral oil are large liquid globules created by pressurized oil forced through larger appropriately sized nozzles. These globules are pressurized white mineral oil being propelled under pressure against the surfaces of the silica particles, as shown in FIGS. 8-11, where each liquid globule has an effective diameter of less than 1,500 microns. In practice, the large oil globules propelled against the falling silica particles have an effective diameter in the range of 800-1,200 microns. In accordance with another definition, the effective diameter of the large liquid globules used in the second embodiment of the invention are greater than 600 microns.

The screened particle size for the silica particles used in the various industries are from a course to fine 12/20 mesh to 50/200 mesh. This particle size range is accomplished by screening the course size and the fine size for the silica particles of the novel mass. The general definition is a D99.9 particle size of 50 microns to 2000 microns or 12 mesh to 200 mesh. In art of hydraulic fracturing long term dust free is a condition wherein the measured low dust concentration is maintained for over four days. By using the present invention, the measured low dust concentration is retained for over 10 days, because the oil is not water based as used in dust suppressant solutions coated onto the particles. Thus, the invention meets the long term dust concentration characteristic for proppants used in hydraulic fracturing.

In accordance with the broad definition of the invention, the low viscosity of the white mineral oil is less than 200 Saybolt SUS at 100° F. Preferably, the viscosity is even lower and is in the range of 60-100 Saybolt SUS at 100° F. However, in practice, the white mineral oil has a viscosity in this range and designated as 60T, 70T, or 100T. Preferably, 70T mineral oil is employed, such as Crystal Plus Oil from STE Oil Company. In accordance with another aspect of the invention, the pour point of the oil is less than −20° C. Consequently, the invention can be used at a low ambient temperature.

The novel mass of silica particles is free flowing. This generally means that it has a moisture content of less than 0.30 percent. This is the controlled moisture content when polymer dust suppressant solutions are used for dust reduction. Such solutions contain water, so the amount must be controlled to a low level when reducing dust concentration in the hydraulic fracturing art for over 4 days. However, the present invention does not use a water based additive and has even less moisture content. The novel natural silica particle mass has been found to have a very small amount of white mineral oil (less than 1000 ppm and preferably 200-600 ppm of weight of the total mass) resulting in a moisture content of less than 0.10 percent, so the mass is free flowing.

To assist in the spreading of the oil, an alcohol solution or a small amount of kerosene can be used.

In accordance with another aspect of the present invention, there is provided a method of producing a novel mass of free flowing, natural i.e. native granularity silica particles that are long term dust free. Each particle has an exposed outer surface. This method provides a mass in a downwardly falling stream of silica particles of the type used in the industries consisting of glass making, metal foundry and hydraulic fracturing. A supply of white mineral oil having a low viscosity in the range of 60-100 Saybolt SUS at 100° F. is formed into discrete liquid masses which are propelled from a number of horizontally arranged nozzles against the falling silica particles. This deposits thin areas of white mineral oil on the exposed outer surfaces of the silica particles to create film areas of white mineral oil that spread to cover 10-60 percent of the total surfaces of the silica particles. This results in measured TWA crystalline silica dust exposure level of less than 0.05 milligrams per cubic meter, so the mass of silica particles remains at a dust concentration of less than 0.05 milligrams per cubic meter for at least 10 days. The silica particles are then collected from the flowing stream of silica particles partially covered with dust capturing white mineral oil film areas created by a small amount of oil.

In the method, the small amount of white mineral oil is in the range of 200-600 ppm by weight of the mass to determine the percentage of total area of the silica particles which is covered.

The liquid masses of white mineral oil are either all atomized droplets with an effective diameter of less than 300 microns or large liquid globules having effective diameters of less than 1,500 microns.

In accordance with the method invention, the silica particles can be advantageously collected in a transport vessel for immediate shipment for locations using the long term dust free silica particles. The falling silica powders are also disbursed by a horizontal inceptor plate to reduce the density of the particles falling so that they are less dense as they are being subjected to the discrete liquid masses being propelled from nozzles toward the falling silica particles in the actual transport loading system.

The primary object of the present invention is provision of a novel mass of natural silica particle which are "long term dust free" for use in the glass making industry and the metal foundry business, as well as for use as a proppant in the hydraulic fracturing field.

Another primary object of the invention is provision of a novel mass of natural silica particles which is rendered "long term dust free" by adding very thin areas of white mineral oil over a limited portion of total surface areas of the silica particles. Such thin areas require very small amount of white mineral oil, very pure unadulterated oil, so there is little, if any, unwanted side effects or impurity contamination when using the treated silica particles and the dust reduction is at a very low cost.

Another object of the present invention is provision of a novel mass of natural silica particles with only a part of their total surfaces covered with a thin film of white mineral oil having a low viscosity, which low viscosity is less than 200 Saybolt SUS at 100° F. and, more particularly, in the range of 60-100 Saybolt SUS at 100° F. and, in practice, 70 Saybolt SUS at 100° F., such as STE Oil Chemical Crystal Plus oil 70T.

In accordance with still a further object of the invention, the white mineral oil film areas cover 10-60 percent of the total surface area of the mass of silica particles.

Yet another object of the present invention is the coverage 10-60 percent of the total surface area of the mass of silica particles is by using less than 1000 ppm by weight of white mineral oil and, more particularly, 200-600 ppm by weight of white mineral oil.

A conclusory object of the present invention is provision of white thin mineral oil film areas on the surfaces of the silica particles to produce a "long term dust free" mass of natural silica particles, which is an eight-hour weighted average (TWA) crystalline silica dust measurement of less than 0.05 milligrams per cubic meter exposure level for over 10 days, where "dust free" is defined as a TWA of less than 0.10 milligrams per cubic meter, which is greater than surprising results from the present invention.

Still a further object of the invention is the method of producing a novel mass of natural silica powder, as defined above, where the white mineral oil is applied as discrete liquid masses onto the surfaces of silica particles as they are falling in a stream, with the discrete liquid mass being small atomized droplets or large liquid globules.

Another object of the present invention is a method of loading the "long term dust free" silica particles into a transport vessel for shipment to the site for using the mass of long term dust free silica particles.

A summary technical object of the invention is provision of a novel mass of natural silica particles having the particle size used in various industries where the silica particles are partially covered by a very thin film or layer of white mineral oil (thus, a highly purified substance) with a small relative weight of less than 1000 ppm of the total mass so the novel mass is "long term dust free" and where the silica particle mass has a very low moisture content so the novel mass is free flowing without an agglomeration tendency.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 is a layout drawing of the preferred manner of implementing the invention;

FIG. 2 is an enlarged pictorial view along line 2-2 of FIG. 1;

FIG. 3 is a listing of an important parameter used in the implementation of the preferred embodiments of the invention as illustrated in FIGS. 4-11;

FIG. 4 is a schematic layout view describing aspects of a mechanism for implementing one embodiment of the invention;

FIG. 5 is a schematic diagram illustrating the falling particle stream and droplet nozzle system used in implementing this embodiment of the invention;

FIG. 5A is a schematic view illustrating one of the droplets D used in the embodiment shown in FIG. 4;

FIG. 6 is an enlarged schematic illustration of a portion of the outer surface of a particle illustrated in FIGS. 4 and 5 covered by novel small droplets and oil surface areas formed by the small droplets to cover the silica particle surfaces;

FIG. 7 is an enlarged schematic illustration of the many small droplet created oil surface covering areas constituting the invention;

FIG. 8 is a schematic layout view of another embodiment of the invention using large globules to cover the surfaces of falling silica particles with oil layers;

FIG. 9 is an enlarged schematic view, like FIG. 6, illustrating a portion of the outer surface of a particle shown in FIG. 8 to depict the oil surface areas formed by the large globules used in the embodiment of FIG. 8;

FIG. 10 is an enlarged schematic illustration of a particle surface with a high percentage covered by the oil surface areas formed by the large globules;

FIG. 11 is an enlarged schematic illustration of a particle surface with a small percentage covered by the oil surface areas formed by the large globules;

FIG. 12 is a layout drawing the preferred commercial implementation of the invention using a loading silo; and, FIG. 13 is a layout drawing of an alternative commercial implementation of the invention using a transloader.

DETAILED DESCRIPTION OF PREFERRED EMBODIMENTS

The two embodiments of the present invention are described in detail in FIGS. 4-11. They relate to the concept of reducing the crystalline silica dust concentration of silica particles and retaining this silica dust reduction for an extended time to allow shipment to the user site. In practice, the invention is implemented during loading a mass of essentially dry, sand-like particulate or granular material into a transport vehicle, such as a truck. The invention is primarily used to ship a mass of silica particles, such as frac sand, which is dust controlled to the site of a hydraulic fracking operation but is also used to ship silica particles to a glass making facility and to a foundry for use there.

Figures 2, 3:
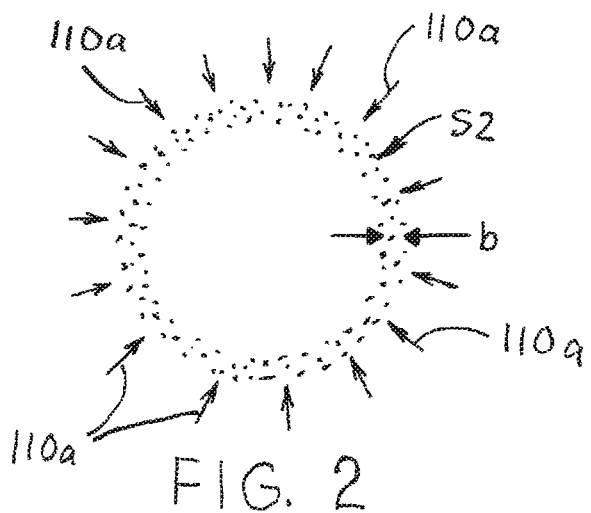
Figure 13:
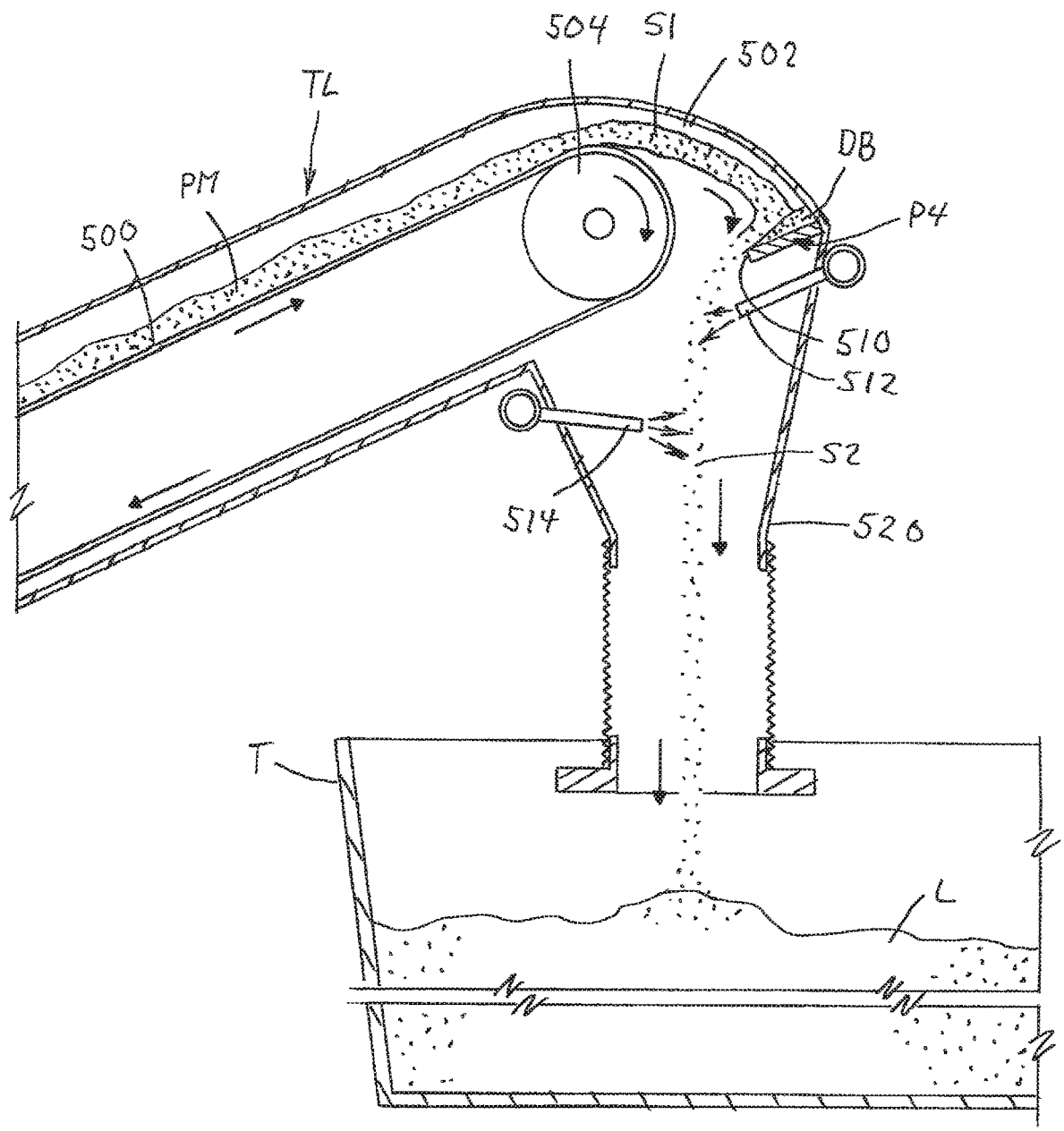

The preferred general implementation of the invention is schematically illustrated in FIGS. 1 and 2 as system 10. Supply silo 20 at the supply facility for the silica particles accepts the natural silica particles for storage and subsequent transportation to the site for use. In system 10, silo 20 has an outlet valve 30, which is normally adjustable and is often rectangular, but could be circular. Valve 30 releases stream S1 of natural silica particles, which particle stream is densely packed into the continuous mass of natural granular silica particles. Such dense particle mass is not easily penetrated by the novel dust control treatment, as shown in FIGS. 4-11. Stream S1 has an effective diameter a, which "diameter" term is used in the fashion of particle shape description, meaning the shape could be rectangular, circular, or otherwise. The effective diameter is an assumed dimension for defining the cross-sectional area of stream S1. Indeed, "effective diameter" also means the general thickness of particle stream S1, such as the width of a square or flat stream as shown in FIG. 13. This dense concentration of silica particles drops downwardly by the force of gravity against a horizontal deflector plate P1 having a drop-off edge 100, which edge is normally circular. After dense particle stream S1 collides downwardly with plate P1, the silica particles cascade over edge 100 to form second silica particle stream S2, which is loose flow of spaced silica particles that allows access to the various particles from the outside because the particles in the stream are less dense and have been diffused by deflector plate P1. The shape of particle stream S2 is shown in FIG. 2. The transverse dimension of the thin circular stream S2 is identified as b that is less than 6 inches, so it can be more easily penetrated by the discrete liquid masses, droplets or globules, used in the two embodiments of the present invention shown in FIGS. 4-11. Furthermore, as illustrated in FIG. 3, the effective diameter a of particle stream S1 is drastically larger than thickness b. In the preferred application, the effective diameter a is preferably in the range of 3-6 inches and at least five times the relatively thin thickness b of particle stream S2. As silica particle stream S2 moves downwardly from drop-off edge 100 of plate P1, a series of nozzles 110 surrounding stream S2. These nozzles spray either small droplets or large globules of low viscosity white mineral oil onto the downwardly falling silica particles. Both of the discrete liquid masses are identified as arrows 110a. This novel dust reduction procedure of using a very low amount of white mineral oil to cover 10-60 percent of the particle surfaces with film areas is explained in more detail in description of the two embodiments shown in FIGS. 4-11. These silica particles are efficiently covered by thin film areas preferably created by discrete liquid masses of white mineral oil areas propelled against the particles. Discrete liquid masses 110a from nozzles 110 penetrate the loose mass of particles in stream S2. Thickness b is controlled to a less dense creating value so the discrete liquid masses penetrates a distance to cover the falling silica particles in the stream. Silica particles cascading from edge 100 are collected as load L of silica particles (proppant, glass making particles, etc.) in the bed of truck T for transport to the particle using site. By using horizontal deflector plate P1 having an area larger than the area of stream S1, the particles create a sand dead bed DB on the top of plate P1. The dense silica particles in stream S1 collide with plate P1 and are accumulated on the plate so that there is no direct contact of the relatively hard particles in stream S1 with the plate. This sand dead bed action protects the plate for long term use.

A first embodiment for practicing the invention is disclosed in FIGS. 4 and 5 where the novel thin white mineral oil film areas are applied by droplets D. Downwardly falling silica particles in particle stream S2 are treated with a selected white mineral oil from supply 200, which mineral oil is atomized into small droplets D by device 210 driven pressurized air from atomizer 210. The pressurized atomized white mineral oil is propelled against the particles in stream S2 as atomized droplets D, schematically illustrated in FIG. 5A. Small atomized droplets D are propelled against the silica particles in steam S2 as indicated by arrows 220 from atomizing nozzles 222. These nozzles are arranged generally horizontally on both sides of stream S2 having an inwardly facing wall 230 and outwardly facing wall 232 as best shown in the schematic partial illustration of FIG. 5. In practice, horizontal nozzles 222 are evenly spaced around one wall 230, as indicated by arrows 220 in FIG. 5. Very small droplets D have an effective diameter X, as shown in FIG. 5A. This effective diameter is less than 300 microns and preferably in the range of 50-100 microns. In some applications, small atomized droplets D have even smaller effective diameters. Droplets D constitute the discrete liquid masses of white mineral oil propelled against the surfaces of particles P, one of which is partially shown in FIG. 6. In accordance with the invention, white mineral oil is used because it is the most refined mineral oil having the least amount of impurities. This purified mineral oil will best reduce the side effects of the silica particles as they are ultimately used. In accordance with the invention, the selected white mineral oil has a low viscosity of less than 200 Saybolt SUS at 100° F. so the film created by spreading of droplets D is very thin. The small droplets of selected white mineral oil constitute less than 1000 ppm by weight of the total mass of particles. Preferably, the amount of white mineral oil deposited on the particles comprises 200 to 600 ppm by weight of the total mass of silica particles. This is a very small amount of white mineral oil that forms the thin film areas of mineral oil on the surfaces of the particles. In accordance with the invention, a very small amount of mineral oil is deposited on the particles as indicated by the process shown in FIG. 4. The thin film areas created by the selected white mineral oil contains a very small amount of oil and covers only 10-60 percent of the total surfaces of all the silica particles. In summary, the selected white mineral oil is a mineral oil having extremely low impurities. Furthermore, the mineral oil has a very low viscosity which preferably in a range of 60-100 Saybolt SUS at 100° F. The small amount of white mineral oil with the low viscosity causes the oil to cover only 10-60 percent of the surfaces of the particles. It has been determined that this low amount of mineral oil has little side effects and constitutes less impurities for subsequent use. The very thin mineral oil film caused by small droplets D reduces silica dust concentration by capturing over 90 percent of the total airborne dust of the particles of the mass to create an 8-hour time weighted average (TWA) crystalline silica dust measurement of less than 0.05 milligrams per cubic meter exposure level. It has also been found that this reduced dust concentration remains at a value of less than 0.05 milligrams per cubic meter exposure for over ten days. Consequently, the natural silica particles can be used as "long term dust free" proppants for hydraulic fracturing as well as "long term dust free" natural silica particles for glass making and use in the foundry industry. Since the white mineral oil is not a water based substance, as previously used for dust control and includes a very small amount of oil, the moisture content of the silica particle mass is less than 0.10 percent and the silica particle mass maintains its free flowing characteristic. This moisture content is well below the 0.30 percent moisture content which must be controlled when the particles are covered by a polymer solution, as in previous techniques for reducing dust in the hydraulic fracturing field. This is a distinct advantageous property of the novel silica particle mass of the invention.

In FIGS. 6 and 7, the surface covering action of propelled small droplets D against the silica particles is schematically illustrated. Silica particles P have an outer surface PS onto which small white mineral oil droplets D collide and are dispersed as thin film due to the extremely low viscosity of the white mineral oil. Droplets D spread to form film areas 240. The droplet formed thin film areas 240 having a thickness defined generally by the low viscosity of the droplets. Since the viscosity is extremely low, the film has a very thin thickness, which may be as low as 2 to 10 molecules of the selected white mineral oil. Since there is a very small amount of white mineral oil used in the process, surface PS has a substantial amount of uncovered area 242 as illustrated schematically in FIGS. 6 and 7. Particle surface PS covered by thinly spread areas 240 capture the dust on the surface of particle P, schematically illustrated as capture areas 250 in FIG. 6. To complete the dust reduction accomplished by the present invention, thin film areas 240 also have a tendency to physically attract and accumulate airborne silica dust AD, as schematically shown in FIG. 6. Consequently, the mass of silica particles is technically "dust free" with a measured dust exposure level of less than 0.10 milligrams per cubic meter. This is a definition of dust free; however, the invention actually reduces the crystalline dust to a measured exposure level of less than 0.05 milligrams per cubic meter. Since areas 240 are formed from a substance that is not water based, the dust exposure level is retained at the low value for a long period of time. Indeed, it has been found that the full mass of silica particles has a reduced dust exposure area or concentration of less than 0.05 milligrams per cubic meter for over ten days. This is substantially greater than the four day retention time of dust reduction water based polymer solutions used in the hydraulic fracturing art where "long term" is defined as more than four days. The present invention creates a novel mass of silica particles which is "long term dust free" even though there is a slight amount of airborne silica dust associated with the mass.

The invention involves creating a long term dust free mass of natural silica particles by using a selected white mineral oil having a low viscosity of less than 200, and preferably 60-100, Saybolt SUS at 100° F. by creating a number of thin film areas spread over surface S of particles A. These film areas are created by discrete liquid masses of selected white mineral oil propelled against surfaces S of silica particles A, so that the mineral oil spreads over the particle surfaces to form very thin oil film areas. These areas of white mineral oil comprise less than 1000 ppm by weight of the mass and preferably 200-600 ppm by weight. There is a small amount of oil spread as thin film over surfaces. Consequently, this small amount of oil creates small, if any, side effects. Surprisingly, such very small amount of oil has crystalline silica dust reduction properties realized by the invention.

Figure 8:
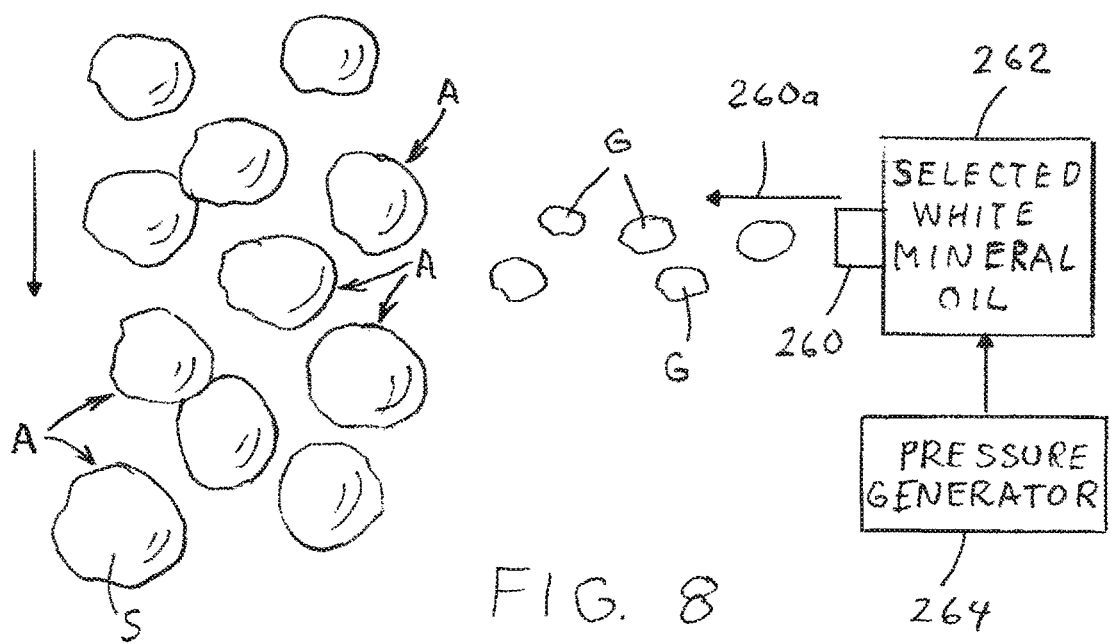

The discrete liquid masses used to practice the invention may be small droplets D, as shown in FIGS. 4-7, or large globules G shown in FIG. 8 where the amount of white mineral oil applied to the surfaces of particles A covers in the range of 10-60 percent of the total surface areas of particles A by spreading the oil of large globules G. These globules are propelled from appropriately sized globule forming nozzles 260, only one of which is illustrated. Nozzles 260 propels a stream of globules G toward the downwardly falling particles A, as indicated by arrow 260a, and are spaced across or around one or both walls of the falling silica particles. These globules have an effective diameter of substantially less than 1500 microns and preferably in the range of 800 to 1200 microns. Indeed, in practice the effective diameter of the large liquid globules G is greater than 600 microns. These globules propelled along arrow 260a from appropriately sized nozzles 260 are formed from the selected low viscosity white mineral oil, as indicated by block 262. This mineral oil is highly pressurized, as indicated by pressure generator 264. The size of the nozzles horizontally arranged across or around the inner wall of the downwardly falling fine particles A, as schematically illustrated in FIG. 5, is selected to determine the desired effective diameter of globules G. Since the amount of mineral oil deposited on the surfaces of particles A less than 1000 ppm of the total mass and preferably 200-600 ppm of the total mass, not all of surfaces S of the particles A are covered. Indeed, surface coverage created by globules G is in the range of 10-60 percent as accomplished when using droplets D.

Figure 9:
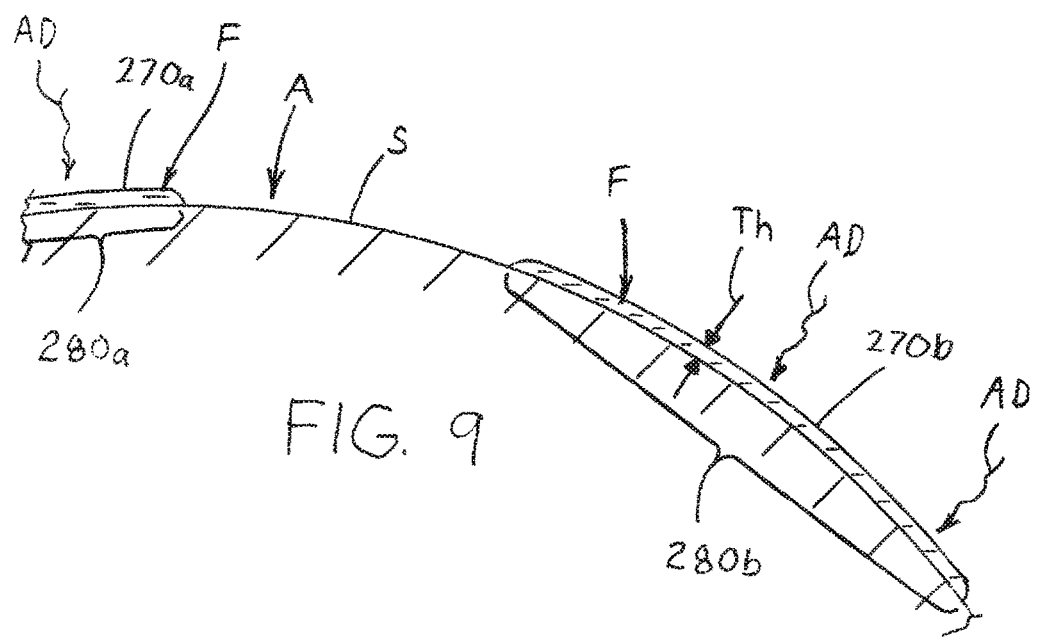
Figure 10:
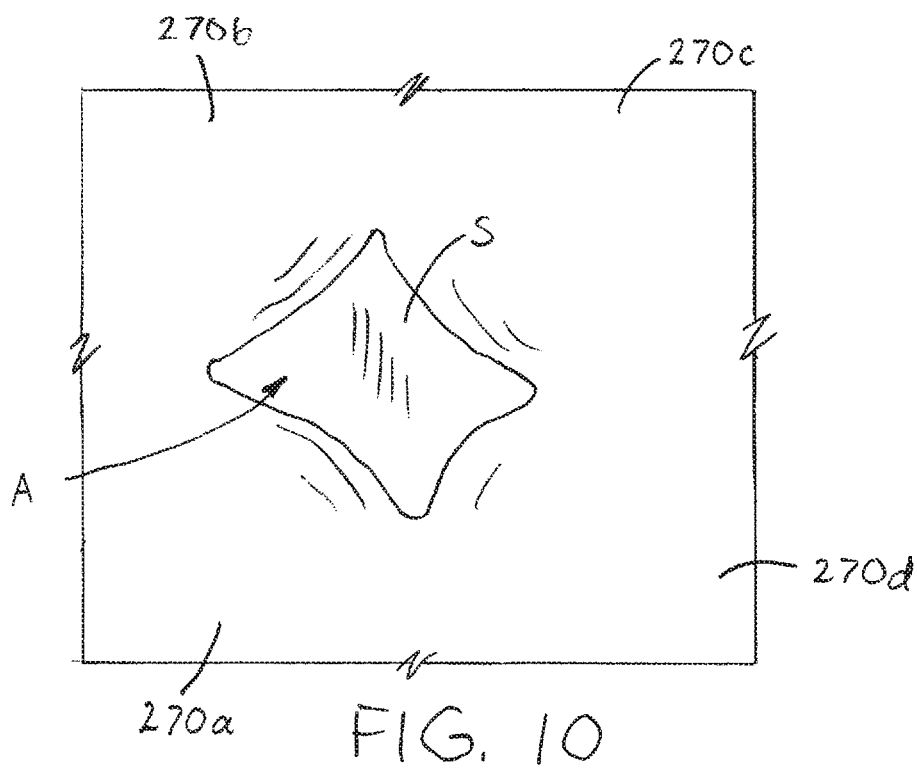
Figure 11:
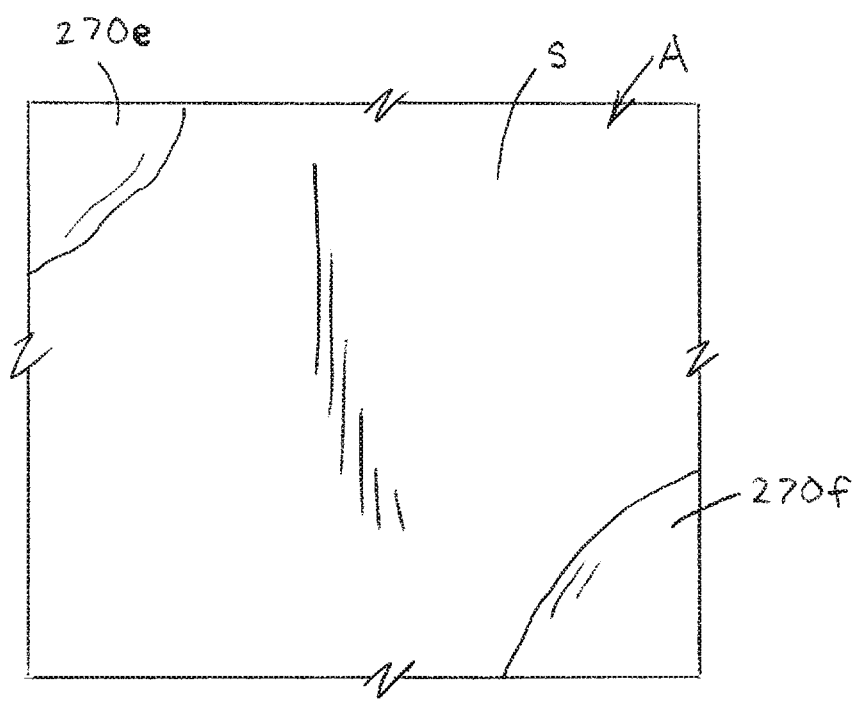

The oil film coverage on particles A created by large globules G is schematically illustrated in FIGS. 9-11. Particles A have an outer surface S covered by film areas 270a and 270b, as shown in FIG. 9. These thin oil film areas are not formed by small droplets, as in the first embodiment, but are merely film areas coated over the surfaces of various particles A to create dust capturing zones 280a and 280b under film areas 270a and 270b. Globules G form film areas 270a, 270b which are film layers F with a very small thickness Th caused by the very low viscosity of the selected white mineral oil. As discussed in FIG. 6, the thin film or layers of white mineral oil on surfaces S also attract airborne dust AD to further reduce the amount of dust and, thus, decrease the crystalline silica dust concentration of the total silica particle mass. Since globules G are relatively large compared to particles A, they are merely propelled against the particles and collide with the particles to create areas 270a and 270b on the outer surfaces S of the various silica particles A. Using this second delivery system, it has been found that some particles may have a large amount of white mineral oil as shown in FIG. 10 wherein the mineral oil areas are illustrated as areas 270a, 270b, 270c, and 270d on the surface that converge to nearly cover total surface S. Indeed, these areas could cover all area of surface S on a given silica particle A. Likewise, a particle A could have a very small amount of oil film areas, as illustrated in FIG. 11, wherein only spaced areas 270e and 270f are formed on a given particle. Indeed, some particles could have no mineral oil. Some particles could have a large amount of mineral oil as indicated in FIG. 10 or very little mineral oil as illustrated in FIG. 11. However, the mineral oil still covers 10-60 percent of the particle surface areas. In accordance with the invention, a very pure mineral oil and a very low viscosity creates a silica dust control technique having a small amount of impurities and minor tendency for side effects while still producing long term dust free silica particles at low cost. A small amount of low viscosity selected white mineral oil is applied in very small amounts of a very thin oil film, which may converge or remain separate. Surprisingly, this very small amount of selected white mineral oil results in "long term dust free" silica particles and the mass remains free flowing. The discrete liquid masses propelled against the particles can be either very small droplets, as shown in the embodiment FIGS. 4-7, or large globules G, as shown in the embodiment of FIGS. 8-11.

In summary, discrete masses (droplets D or globules G) have a very small weight relationship to the total mass of natural silica particles, but, the low viscosity of the selected white mineral oil (less than T200 and preferably T60-T100) causes the small amount of oil to cover 10-60 percent of the total surface area of the mass. Using the selected white mineral oil involves the lowest impurity level to reduce side effects which are further reduced by the small amount of oil needed to practice the invention. Since there is little, if any water, the low dust concentration is "long term".

Figure 12:
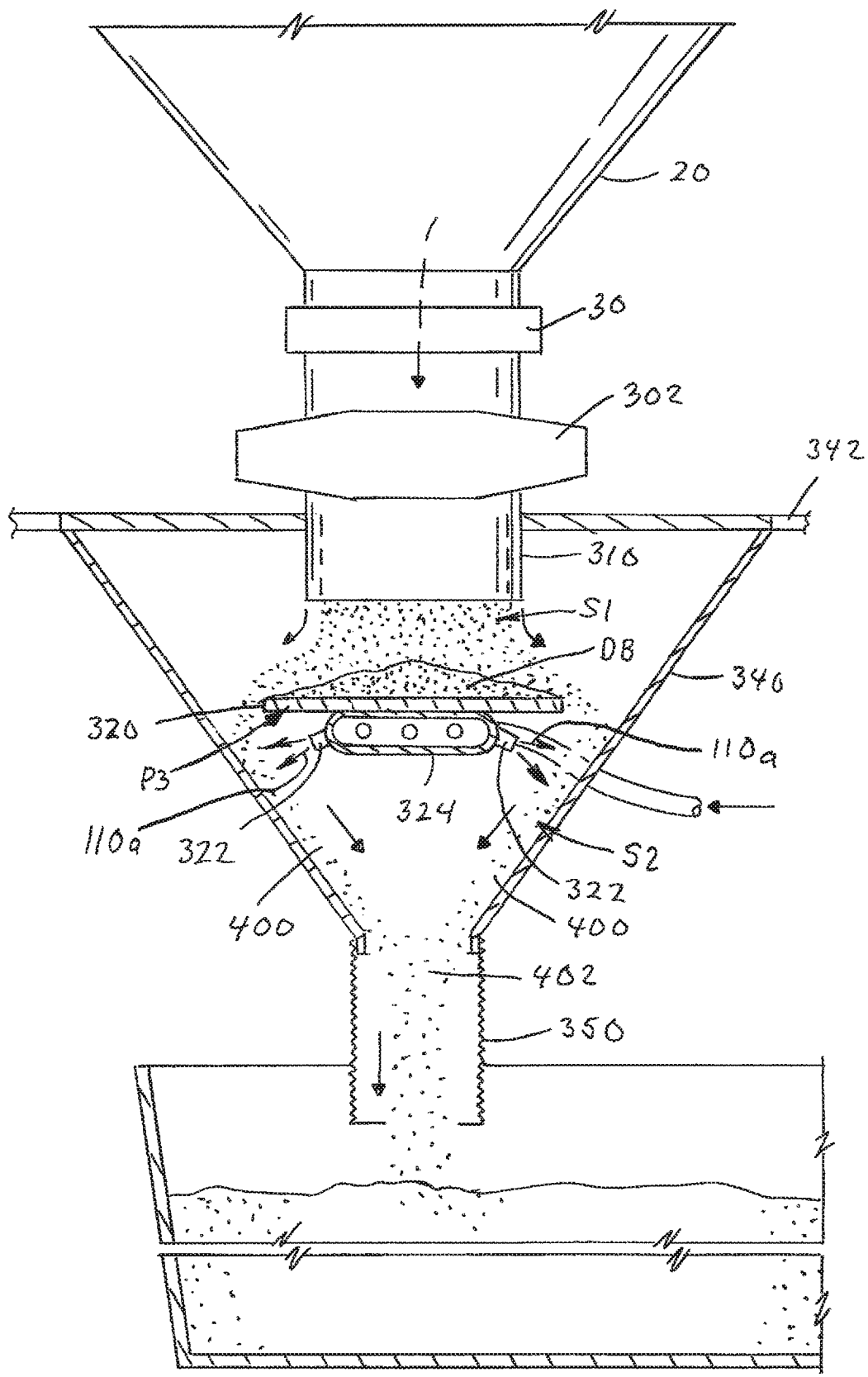

FIG. 12 is a layout drawing of a system used in practice for implementing the present invention as it has been explained in the two embodiments of FIGS. 4-11. In this practical loading mechanism, system 300 includes silo 20 as generally discussed in FIG. 1 with adjustable valve 30, as previously described. In this practical implementation of the invention, there is provided a dust collector 302 preceding discharge outlet 310 for creating stream S1. Circular plate P3 has drop-off edge 320. A series of nozzles 322 designed to create a flow of discrete liquid masses, such as small droplets D in FIGS. 4-7 with an effective diameter in the range of 50-100 microns, i.e. less than 300 microns, and to direct this mass of dust control small droplets formed from low viscosity white mineral oil in manifold 324 onto the inside from the downwardly falling silica particle stream S2. Alternatively, nozzles 322 are designed to propel pressurized large globules G of white mineral oil to perform the embodiment of FIGS. 8-11 where the effective diameters of the globules are less than 1500 and greater than 600 microns. Preferably the effective diameters are in the range of 800-1200 microns. The design and structure of nozzles 322 are within the skill of the art, as long as small oil droplets D are created or large pressurized globules G are created to practice the invention. Moveable spout 340 is set in place by spout positioner track 342. Downwardly falling stream S2 is formed into a cone shape configuration by spout 340. Stream S2 as described in FIGS. 1 and 2 is shown as a cone shaped configuration having diverging sides 400 converging at outlet point 402 directly above load outlet spout 350 of silo 20. FIG. 12 illustrates the sand dead bed advantage wherein horizontal plate P3 accumulates silica particles, as illustrated by the dead bed DB. Consequently, horizontal deflector plates used in the invention as illustrated in FIG. 1 has a long life since the rapidly moving particles do not contact the surface of the deflector plate to cause wear of the plate.

A primary use of the present invention in practice is for a silo loading device, as illustrated in FIGS. 1 and 8; however, the invention can be used when a transloader TL loads particle material PM into transport truck T or other transport vessel, as illustrated in FIG. 13. In this practical implementation of the invention, conveyor belt 500 directs silica particle material PM into conformed discharge compartment 502 projecting over outer wheel 504 of the loader. Material PM flowing from the belt into compartment 502 is in the form of stream S1 that collides with the upper surface of a somewhat horizontal deflector plate P4 as a dense particle stream S1 of condensed silica particles is directed to the generally horizontal plate in this transloader version of the immediate transportation aspect of the present invention. Plate P4 has an outer drop-off edge 510, which is generally a flat or curved surface, over which stream S2 cascades in the same fashion as previously described. The surfaces of silica particles in downwardly falling stream S2 are covered by film areas constituting 10-60 percent of the total surfaces of the silica particles. This novel concept of partially covering the silica particles by propelling discrete liquid masses of low viscosity white mineral oil directed against the falling particles by vertically spaced groups of appropriately designed sets of nozzles 512, 514. The discrete liquid masses are either small droplets D or large globules G. The nozzle sets create a dust free stream S2 of silica particles for deposit into truck T. Thus, the dust free, and long term, silica particles can be available for immediate transportation to the hydraulic fracturing site for proppants or to the glassmaking site for silica particles used as fillers in this industry.

Summarizing the Invention

The invention involves creating surface film areas of white mineral oil with a low amount to cover 10-60 percent of the surfaces of a mass of silica particles. This novel concept can be accomplished by depositing a large number of small droplets D on the surfaces of the silica particles as described in FIGS. 4-7. As an alternative, the surface film areas can be created by pressurized large globules G of white mineral oil propelled against the falling silica particles, as shown in FIGS. 8-11. These many discrete liquid masses spread rapidly forming very thin film areas of dust control oil to cover the surface silica dust and capture airborne silica dust. The invention in the novel concept of using very low weight of white mineral oil, with a low viscosity of less than 200 Saybolt SUS at 100° F., preferably 60-100 Saybolt SUS at 100° F., i.e. T60, T70 and T100, white mineral oil. Consequently, the dust concentration is drastically reduced with very little white mineral oil, such as less than 1000 ppm and preferably 200-600 ppm by weight of the mass. This small amount of white mineral oil is less than 0.10 percent by weight of the silica particle mass. Use of such low weight of white mineral oil results in little, is any side effects, which is extremely important when the silica particles are used for glass making and when used in the metal foundry industry. Since the dust control oil is not water based, the low dust concentration obtained by the application of discrete liquid masses remains for a long time, such as at least 10 days. This feature of the invention is again very applicable to use of the silica particles in glass making. It has been found that the silica particles used in hydraulic fracturing are used in a short time, less than 4 days. However, in the glass industry, it is necessary for the silica particles to retain the low dust concentration caused by the use of a small amount of white mineral oil covering surfaces of the particles for a substantially longer time. This long term retention of low dust concentration characteristic is obtained by the novel silica particle mass of the present invention.

When the white mineral oil is applied, as disclosed in FIGS. 4-11, the silica particles will have an average TWA dust measurement of less than 0.05 milligrams per cubic meter exposure level and are therefore classified as "dust free". In the relevant hydraulic fracturing art, "dust free" means an average measured TWA dust exposure level of less than 0.10 milligrams per cubic meters. Thus, the silica particles produced by the novel concepts are clearly "dust free".

The present invention reduces the airborne dust concentration by over 90 percent. As is well known, that an eight-hour time weighted average (TWA) of the crystalline silica dust of the mass after application of the discrete liquid masses of white mineral oil involving small droplets atomized by air pressure in one embodiment or large pressurized globules in the second embodiment. The extended time of measured exposure level (TWA) of less than 0.05 milligrams per cubic meter is over 10 days making the silica particles "long term dust free" which term means keeping the silica particles measured exposure level to less than 0.05 milligrams per cubic meter for at least four days. Since no water is used in the present invention, the low dust concentration level is maintained over 10 days, thereby, meeting and surpassing the characteristic of "long term dust free" silica particles.

Three examples were used in developing the invention using the embodiment in FIG. 4-7. Crystal Plus Oil 70T was the low viscosity white mineral oil used. 70T means the Saybolt SUS at 100° F. (standard viscosity designation) is 70. This viscosity designation compares to cST at 40° C. of 12.3 or about 12-13.

In the first example using 70T oil a low weight of 0.10 percent of the weight of the silica particle mass was employed. There was a 97 percent reduction in TWA measured exposure level and it retained level of less than 0.05 milligrams per cubic meter for over 10 days. The second example used mineral oil of only 0.05 percent by weight of the silica particle mass, but the dust reduction was still about 98 percent. The other characteristics were generally the same as in the first example. A third example used mineral oil of only 0.025 percent by weight of the silica mass. Even with this extremely low weight of mineral oil, the claimed characteristics of the invention were obtained with less surface coverage. These results are extremely surprising in that so little white mineral oil is needed in practicing the invention, i.e. less than 1000 ppm and preferably 200-600 ppm. Thus, the side effects are limited, and the cost is drastically reduced. Further examples using the embodiment of FIGS. 8-11 with the same amount of white mineral oil accomplished the same crystalline silica dust reduction values and lasted over 10 days. It was discovered that the advantage of the invention is use of the invention as described and claimed, irrespective of which embodiment was practiced.

In summary, by using 200-600 ppm white mineral oil with a very low viscosity, T60, T70 or T100, the crystalline silica dust measure level is reduced to less than 0.05 milligrams per cubic meter and, without water, the low crystalline silica dust level below this level is maintained by over 10 days. The mineral oil areas are very thin films spread over the particle surfaces. The low thickness and large coverage by the spreadability of the surface covering is due to the very low viscosity of the extremely pure mineral oil. The purity of the mineral oil also reduces side effects. The silica dust concentration is reduced by capturing dust on the surface and attracting airborne free dust. The silica particles are "dust free" and are "long term dust free".

When defining aspects of the invention, selected or targeted effective diameters of the discrete liquid masses of white mineral oil, whether small droplets or large globules, are specified. It is acknowledged that, as a practical matter, there will be an insignificant or very minor number of the discrete liquid masses outside such selected or targeted effective diameters. However, at least 99 percent or more likely over 99.9 percent of the discrete liquid masses are within the stated effective diameters. This concept relates to any targeted value of the parameters of the invention, where appropriate, such as particle grain size.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

It is claimed:

1. A mass of free flowing silica particles wherein the surfaces of said particles have very thin film areas of an extremely pure substance having a low viscosity of less than 200 Saybolt SUS at 100° F., said very thin film areas of extremely pure substance on said silica particles cover 10-60 percent of the total surfaces of said silica particles, said extremely pure substance contains no water and is a liquid that captures over 90 percent of the total airborne silica dust of said particles of said mass, whereby said very thin film areas reduce silica dust by covering a portion of the surfaces of said particles and by capturing said airborne dust of said particles of said mass to create an eight-hour weighted average (TWA) crystalline silica dust of less than 0.05 milligram per cubic meter exposure level and said reduced exposure level of crystalline dust remains at a value of less than 0.05 milligram per cubic meter exposure for over 10 days.

2. A mass of free flowing silica particles as defined in claim 1 wherein said very thin film areas comprise less than 1000 ppm by weight of said mass.

3. A mass of free flowing silica particles as defined in claim 1 wherein said very thin film areas of extremely pure substance have a thickness less than ten molecules.

4. A mass of free flowing silica particles as defined in claim 3 wherein said extremely pure substance containing no water and capable of capturing airborne silica dust is white mineral oil.

5. A mass of free flowing silica particles as defined in claim 2 wherein said extremely pure substance containing no water and capable of capturing airborne silica dust is white mineral oil.

6. A mass of free flowing silica particles as defined in claim 1 wherein said extremely pure substance containing no water and capable of capturing airborne silica dust is white mineral oil.

* * * * *